United States Patent
Birze (12)

(10) Patent No.: US 6,526,457 B1
(45) Date of Patent: Feb. 25, 2003

(54) SYSTEMS UTILITY OBJECT INTERFACE FOR FACILITATING SOFTWARE PORTABILITY

(75) Inventor: Brigitte Bernadette Birze, Plano, TX (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 08/957,421

(22) Filed: Oct. 24, 1997

Related U.S. Application Data

(60) Provisional application No. 60/029,220, filed on Oct. 30, 1996.

(51) Int. Cl.[7] .................................................. G06F 9/00
(52) U.S. Cl. ........................ 709/328; 709/315; 709/104
(58) Field of Search ....................... 717/1, 5, 2; 709/315, 709/319, 328, 104

(56) References Cited

U.S. PATENT DOCUMENTS

| | | | |
|---|---|---|---|
| 5,315,703 A | | 5/1994 | Matheny et al. ............. 345/700 |
| 5,371,884 A | | 12/1994 | Ross ............................ 714/10 |
| 5,379,431 A | | 1/1995 | Lemon et al. ................. 710/10 |
| 5,379,432 A | | 1/1995 | Orton et al. .................. 709/315 |
| 5,404,529 A | | 4/1995 | Chernikoff et al. .......... 709/315 |
| 5,450,583 A | * | 9/1995 | Inada .......................... 395/650 |
| 5,455,951 A | | 10/1995 | Bolton et al. ................ 709/103 |
| 5,475,845 A | | 12/1995 | Orton et al. ................. 709/328 |
| 5,493,680 A | * | 2/1996 | Danforth ..................... 395/700 |
| 5,504,892 A | | 4/1996 | Atsatt et al. ............. 707/103 R |
| 5,519,867 A | | 5/1996 | Moeller et al. .............. 709/107 |
| 5,546,595 A | | 8/1996 | Norman et al. ................ 710/10 |
| 5,548,779 A | | 8/1996 | Andert et al. ............... 709/203 |
| 5,566,346 A | | 10/1996 | Andert et al. .................. 710/8 |
| 5,574,915 A | | 11/1996 | Lemon et al. ............... 712/220 |
| 5,583,983 A | * | 12/1996 | Schmitter .................... 395/705 |
| 5,832,264 A | * | 11/1998 | Hart et al. ................... 395/683 |
| 5,940,616 A | * | 8/1999 | Wang .......................... 395/704 |

OTHER PUBLICATIONS

K. Saito, et al, "Applying Object Oriented Programming to Developing Programs on CTRON Interfaces", IEEE, pp. 103–117, Nov. 1991.*
S. Lippman, C++ Primer, 2nd ed. Addison–Wesley, pp. 244–249, 256–257, 1991.*

* cited by examiner

*Primary Examiner*—Sue Lao
(74) *Attorney, Agent, or Firm*—Baker Botts L.L.P.

(57) ABSTRACT

A method of providing operating system utilities for use by an applications program for a number of different operating systems. For each utility, a base class is created. The base class is defined in a header file and declares a static member function for creating the utility as an object and also declares virtual member functions for using the utility as an object (FIG. 2). The base classes and their static member functions are generic to all operating systems. A programmer includes the header file and invokes the member functions, which are implemented in a library of system-specific derived classes (FIGS. 1 and 2).

18 Claims, 1 Drawing Sheet

SYSTEMS UTILITY OBJECT INTERFACE FOR FACILITATING SOFTWARE PORTABILITY

CROSS-REFERENCE TO RELATED APPLICATION

This application claims the benefit of U.S. Provisional Application Ser. No. 60/029,220, filed on Oct. 30, 1996.

TECHNICAL FIELD OF THE INVENTION

The present invention relates to computer programming, and more particularly to methods of improving portability of applications programming between computers having different operating systems.

BACKGROUND OF THE INVENTION

A computer "operating system" is software that controls the execution of applications programming, and typically includes "utility" programs that provide commonly needed services that facilitate the use of the computer by applications software. These services include such services as scheduling, input/output control, storage assignment, and data management.

Today's general purpose computers are available with a number of different operating systems. Although utilities are common to some extent, each operating system may have utilities that operate differently or that are unique to that system.

A problem in developing applications software is that of portability between operating systems. Much of the porting effort is directed to making use of operating system utilities. An applications program must either have a different version for each system or it must contain a means to invoke and use the utilities of a number of different systems.

One approach to portability is to provide conditional compile statements in the applications program. These statements operate in conjunction with the C preprocessor. For example, a program written in the C++ programming language might have statements such as:

ifdef [name of operating system]
include <[name of utility file 1 for that system]>
include <[name of utility file 2 for that system]>
. . .
endif A similar set of statements is required for each operating system. Although conditional compiles isolate system-specific code, the above approach requires the applications programmer to invoke each utility with its system-specific name.

Another approach to portability treats utilities as objects and uses object inheritance. Consistent with well known object-oriented programming concepts, the "objects" are software entities comprising data structures and operations on the structure's data. Objects can model concrete things or abstract ideas, in terms of characteristics as represented by data elements, or in terms of behavior as represented by data manipulation functions. Objects are defined by creating "classes", which act as templates that instruct a compiler how to construct an actual object. For example, a class may specify that number and type of data variables and the steps involved in functions that manipulate the object. An object created from a certain class is called an "instance" of that class. In the case of utilities, each utility is represented by an object whose behavior is defined by a base class. Operating system specific classes inherit from the base class. An applications programmer can invoke the utility with the base class name, and in this manner, the applications software is isolated from the operating system. However, this approach to porting does not eliminate the need for conditional compiles to specify which operating system class to create.

"Cross-platform" development tools have also been developed. However, these tools provide programming environments, supplying high level applications programming interfaces. Although the system utilities can be-presented generically, the applications programmer must learn how to use the environment and is entirely enveloped by that environment during the program development process.

SUMMARY OF THE INVENTION

One aspect of the invention is a method of providing operating system utilities for use by an applications program for a number of different operating systems. For each utility, a base class is created. The base class is defined in a header file and declares a static member function for creating the utility as an object. For each operating systems, a derived class is also created for each utility. This derived class includes the base class and either contains or includes a definition of the static member function. The derived classes are contained in a utility object library, which is linked to the system utilities. After the program is compiled and the derived classes are linked, it may invoke the static member function and include said header file. When the program is executed, a system-specific instance of the derived class is created and the utility is executed.

An advantage of the invention is that minimal programming effort is required of an applications programmer who wishes to invoke operating system utilities. The programmer can write the program to a generic operating system. The utilities themselves are also generic. As a result, once the programmer learns the generic operation of the service as defined by the base class, the programmer needs no further knowledge of the operation of the utility within a particular operating system. For example, once a programmer learns how and when a semaphore (a utility that coordinates two or more concurrently running programs) should be used, the programmer need not learn the call and behavior specific to an operating system. To use a given utility, the programmer need only include a base class header file for that utility, create a utility object with the static member function, and invoke the utility object methods.

Building code once it is written is also simple. No conditional compiles are required. To execute the program on a given operating system, the programmer merely links the program with the utility object library for that operating system. There is no need for special compiling or linking to the system utilities.

Finally, the programmer is not constrained to develop code with a new programming environment. He or she may use or not use the utility object library as desired.

DETAILED DESCRIPTION OF THE INVENTION

As explained below, the invention is directed to an extension of object-oriented programming to a system utilities library. This library provides a layer of abstraction between software using the library and the operating system on which the software is running. For purposes of this description, the software using the library is referred to as an "applications program" regardless of whether it is the highest level of programming that be ultimately be executed by an end user.

Figure 1:
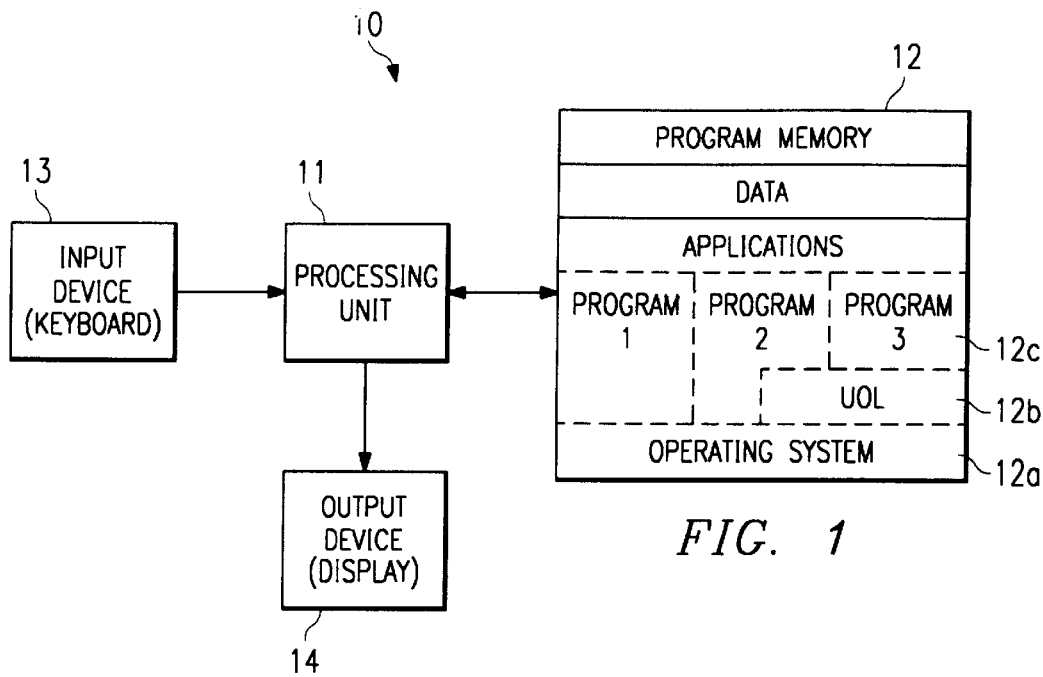
FIG. 1 illustrates a computer system programmed with a system specific operating system, a utility object library in accordance with the invention, and at least one applications program in accordance with the invention.

FIG. 1 illustrates a typical computer system 10, with which the invention may be used. A processing unit 11 has at least one processor, internal memory, and appropriate I/O (input/output) components. An example of a processing unit 11 is a personal computer, such as that manufactured by International Business Machines. A memory 12, such as a hard disk drive, stores programming executed by the processing unit 11 and data operated on during program execution. An input device 13, usually a keyboard, is used to enter data. For purposes of this description, where the "user" is a programmer of applications software, the input is source code and libraries for an applications program. Other input devices could be used, such as voice recognition devices. Multiple input devices can be used, such as is usually the case with a trackball or other pointing device. An output device 14, usually a display, displays whatever user interface is appropriate for the data being entered, accessed, or operated on.

As illustrated in FIG. 1, memory 12 stores various "layers" of programming. At the lowest level, is the operating system 12a. Examples of operating systems 12a with which the invention is useful are OS/2, Windows, Win32, HPUX, Solaris, and AIX. A processing unit 11 and its particular operating system 12a are sometimes referred to as the "platform" upon which other programming will run. A utility object library (UOL) 12b in accordance with the invention interfaces with the operating system 12a and with at least one applications program 12c. As stated above, an applications program 12c may itself be the basis for additional layers of higher level programming.

A feature of the invention is that UOL 12b is not a programming environment. The applications programmer may use as much or as little of UOL 12b as desired. Thus, as indicated in FIG. 1, one applications program 12c may use the library for all utilities, another may use it for some, and another may not use it at all. In other words, a computer 10 may run applications programs that use UOL 12b as well as programs that interact directly with the operating system 12a or programs that do both.

As explained below, UOL 12b is a library that creates utility objects. By "utility object" is meant an object that supports a system utility. A "system utility" is generally defined as a program that provides commonly needed services that facilitate the use of the computer by applications software. Examples of system utilities are event semaphore, mutex semaphore, dynamic link library, sleep, and threads.

For purposes of this description, the applications program 12c is assumed to be written in the C++ programming language. Thus, examples herein are in C++. However, the same concepts apply to any object-oriented programming language that supports base classes, derived classes, static member functions, and header files, or their equivalents. The mechanisms listed in the preceding sentence are well known to those familiar with C++ programming, and are used consistently with C++ use for purposes of this description.

Figure 2:
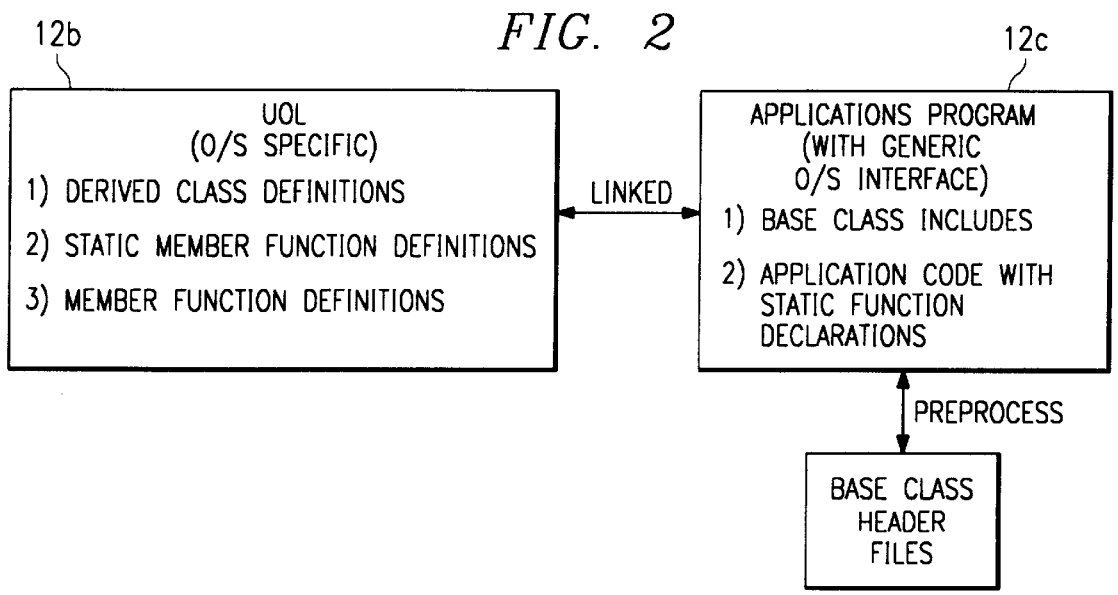
FIG. 2 illustrates the relationship between the utility object library and an applications program using the utility object library.

FIG. 2 illustrates the relationship between UOL 12b and an applications program 12c. As explained below, UOL 12b is comprised of derived classes. It contains definitions for the derived classes, and for each derived class, definitions of member functions and a static member function. The applications program 12c is comprised of code that creates and uses the utility objects and also contains header files for base classes. These base classes are an interface to the UOL 12b, which is a system-specific implementation of the base classes. The UOL 12b and the applications software 12c are linked prior to run-time operation.

More specifically, each object available from the UOL 12b is defined with a base class. Each base class resides in its own header file. Consistent with the C++ programming language, a header file may contain a class definition and another file may have an #include <filename> command, which a preprocessor will replace with the contents of filename.

The collection of base class header files comprises an interface that is not specific to any operating system. The applications programmer deals with these header files without being concerned with the particular operating system on which the applications software will run. As explained below, the applications programmer includes the headers in the applications software. Then, the header files are compiled into the applications software.

Each base class declares a static member function, which is used to create the object. The base class is an abstract class with pure virtual member functions. Its constructor is protected. Thus, the only way to create the object is with the static member function.

As an example of a base class definition, the following is the definition for the base class MutexSemaphore:

```
class MutexSemaphore {
    public:                    // instance class functions
        static      MutexSemaphore*newSemaphore( );
    public:                    // instance member functions
        virtual     ~MutexSemaphore( ) {}
        virtual     Error set( )=0;
        virtual     Error block( )=0;
        virtual     Error clear( )=0;
    protected:
        MutexSemaphore( ) {error=okay;}
        MutexSemaphore(MutexSemaphore&) { }
        Error error;
};
```

Given the above MutexSemaphore base class definition, the only way to create a mutex semaphore object is through the MutexSemaphore::newSemaphore static member function.

A feature of the invention is that a programmer of applications software who desires to use a utility object in UOL 12b need only include the base class header file in the software, invoke the static member function to create the object, and invoke the virtual member function(s) to use it. He or she needs no knowledge of the operating system on which the software will run. For example, a portion of applications software that includes the header file would look like this:

include <name of base class file>

The portion of the applications software that creates and uses a utility object, for example a mutex semaphore, might look like this:

MutexSemaphore*mySem =
      MutexSemaphore::newSemaphore( );
   if (mySem != 0) {
   mySem -> clear( );
   mySem ->set( );
   }

The above code will create a mutex semaphore regardless of the operating system.

The virtual member functions of the base class define the legal behavior of the object. The virtual member functions of the base class are defined in classes derived from the base class. The virtual member functions are "pure", which means that the derived classes must supply a definition.

A particular operating system will have an associated UOL 12b. In other words, a UOL 12b is comprised of system-specific classes, which are derived from base classes. For a given base class, there is one derived class for each operating system.

For example, for a Win32 operating system, the source file would contain or include the definition of the derived class for mutex semaphore, Win32MutexSemaphore, as follows:

include <windows.h>
include <csusmm.hxx> // MutexSemaphore base class
class Win32MutexSemaphore:publicMutexSemaphore {
public: // instance member functions
Win32MutexSemaphore( );
virtual ~Win32MutexSemaphore( );
virtual Error set( );
virtual Error block( );
virtual Error clear( );
  private:
    Win32MutexSemaphore
     (Win32MutexSemaphore&) { }
    HANDLE semID; //ID for Win32 mutex semaphore
};

As shown above, the derived class includes the base class header file and inherits from the base class.

For any operating system, the UOL 12b has one derived class for each utility object. For example, for the Win32 operating system, Win32MutexSemaphore, a derived class, is the implementation for the mutex semaphore object.

The source file for a derived class contains (or includes) a definition for each member function. These definitions satisfy the implementation of the virtual member functions of the base class. The source file also contains the definition of the static member function that was declared in the base class, and thus contains the static member function implementation. For example, in the case of the Win32Mutexsemaphore class, a definition for the static member function is:

```
MutexSemaphore*
MutexSemaphore::newSemaphore( )
{
    MetexSemaphore*sem = newWin32MutexSemaphore;
    if (sem && sem -> error!=okay) {
        delete sem;
        sem=0;
    }
    return sem;
}
```

The static member function will create an instance of the derived class. In the preceding example of the definition for the newSemaphore static member function, when an application programmer creates a mutex semaphore via that static member function, a Win32MutexSemaphore object is returned. The declaration of the static member function is not system specific, but the implementations of the static member function and the returned object are. The derived class for each operating system has a different implementation of the static member function.

The static member function checks the success of the system call to create the system utility as well as the allocation of memory for the object. If the object is allocated but there is a problem with the creation of its associated system utility, the object is deleted and the user is returned a 0. If the static member function returns a valid pointer, the applications programmer is thereby informed that the object is valid and ready to use.

An applications programmer may invoke a utility that is not present on all platforms on which the software may run. For example, the Windows platform does not support a mutex semaphore. However, referring to the above base class example, the MutexSemaphore base class nevertheless permits a WinMutexSemaphore class to be derived. The MutexSemaphore::newSemaphore static member function will create and return a WinMutexSemaphore. All member functions of the WinMutexSemaphore class return successful error objects. Thus, the programmer can develop source code as though all operating systems will provide a mutex semaphore. When the program is executed, an object will be instantiated that either creates the utility if the utility is supported by the target operating system or performs as a dummy object if the utility is not supported.

As a result of the virtual member functions of the base class, the behavior of utilities is generic to all operating systems. For example, in the above examples of the mutex semaphore utility, the virtual member functions (set, block, and clear) are declared in the base class MutexSemaphore. Their implementations in the derived classes ensures that all operating system execute them in the same manner. For example, the Win32MutexSemaphore derived class declares these virtual member functions and provides their implementation.

The source file for each derived class is compiled with the flags and settings necessary to support the system utilities of the associated operating system. Then, the source object files of all the derived classes are linked with the operating system utility libraries to create UOL 12b, which is then linked with the applications program. Thus, an applications programmer need not. use extra compiler options or environmental variables to specify the target platform.

UOL 12b is packaged as a shared library for UNIX systems and as a DLL (dynamic link library) for PC platforms. This permits UOL 12b to link and reference system libraries. At the linking phase of program development, the programmer need only link with UOL 12b for access to its utilities. There is no need for linking to the system utilities.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of providing an operating system utility for use by an applications program for a number of different operating systems, comprising:

creating a base class for said utility, said base class declaring a static member function for creating said utility as an object and declaring at least one virtual member function for using said object, and said base class being defined in a base class header file;

defying a derived class for each of said operating systems to create a plurality of derived classes, wherein each of the derived classes includes said base class, defines said virtual member function to create a derived class implementation, and defines said static member function such that said static member function creates an instance of said derived class to create a static member function implementation; and building linkable objects from said derived class implementation and said static member function implementation, such that said applications program may include said base class header file and link with at least one of said linkable objects to create and use said operating system utility, wherein building said linkable objects comprises compiling at least one of said derived classes with flags and settings for a particular operating system.

2. The method of claim 1, wherein said method is performed using the C++ programming language.

3. The method of claim 1, wherein said virtual member function is a pure virtual member function.

4. The method of claim 1, further comprising using said linkable objects to create a dynamic linked library, which references said operating system utility.

5. The method of claim 1, wherein said base class has a protected constructor.

6. A method of creating an applications program that uses at least one utility of an operating system, comprising:

including a base class header file, said header file defining a base class associated with said utility and said base class having a static member function declaration that declares a static member function that is operable to create said utility as an object and having at least one virtual member function declaration;

wherein neither said base class header file nor said static member function declaration are specific to any operating system;

linking said applications program to one of a plurality of derived class implementations that defines said virtual member function and to one of a plurality of static member function implementations that defines said static member function, wherein each of the derived class implementations corresponds to a different operating system and each of the static member function implementations corresponds to a different operating system, at least one of the derived class implementations and at least one of the static member function implementations generated by compiling at least one of a plurality of derived classes derived from said base class with flags and settings for at least one of the different operating systems; and invoking said static member function and said virtual member function.

7. The method of claim 6, wherein said method is performed using the C++ programming language.

8. The method of claim 6, wherein said virtual member function is a pure virtual member function.

9. The method of claim 6, wherein said base class has a protected constructor.

10. A method of providing an operating system utility for use by an applications program, comprising:

creating a base class that declares a static member function for creating a utility object and at least one virtual member function for using the utility object;

creating a derived class for each of a plurality of operating systems, the derived class defining the virtual member function, the derived class also defining the static member function such that the static member function creates the utility object as an instance of the derived class; and building at least one utility object library associated with at least one of the operating systems, wherein building the at least one utility object library comprises compiling the derived class associated with at least one of the operating systems with flags and settings for the at least one operating system, wherein an applications program may use the utility in one of the operating systems by linking to the utility object library associated with the operating system.

11. A method of creating an applications program that uses at least one operating system utility, comprising:

including a base class header file in the applications program, the header file defining a base class associated with the utility, the base class declaring a static member function for creating a utility object and at least one virtual member function for using the utility object;

linking the applications program to one of a plurality of utility object libraries, each library associated with one of a plurality of operating systems, at least one utility object library generated by compiling at least one of a plurality of derived classes with flags and settings for at least one of the operating systems, each derived class associated with one of the operating systems, the derived class defining the virtual member function, the derived class also defining the static member function such that the static member function creates the utility object as an instance of the derived class; and invoking the static member function and the virtual member function.

12. A system for providing access to an operating system utility, comprising:

at least one computer readable medium;

a base class header file encoded on the computer readable medium and operable to be included in an applications program, the base class header file containing a base class that declares a static member function for creating a utility object and at least one virtual member function for using the utility object; and at least one utility object library encoded on the computer readable medium and operable to be linked to the applications program, the at least one library associated with at least one of a plurality of operating systems the at least one utility object library generated by compiling at least one of a plurality of derived classes with flags and settings for at least one of the operating systems, each derived class associated with one of the operating systems, the derived class defining the virtual member function, the derived class also defining the static member function such that the static member function creates the utility object as an instance of the derived class, wherein an applications program may use the utility in one of the operating systems by linking to the utility object library associated with the operating system.

13. A system for providing access to an operating system utility, comprising:

at least one computer readable medium;

a base class header file encoded on the computer readable medium and operable to be included in an applications program, the base class header file containing a base class that declares a static member function for creating a utility object and at least one virtual member function for using the utility object; and at least one linkable object encoded on the computer readable medium and operable to be linked to the applications program, the at least one linkable object associated with at least one of a plurality of operating systems, the at least one linkable object created using at least one of a plurality of derived classes, each derived class associated with one of the operating systems, the derived class defining the virtual member function, the derived class also defining the static member function such that the static member function creates the utility object as an instance of the derived class, wherein an applications program may use the utility in one of the operating systems by linking to the linkable object associated with the operating system, the at least one linkable object generated by compiling at least one of the derived classes with flags and settings for at least one of the operating systems.

14. A system for providing access to an operating system utility, comprising:

a memory operable to store:
   a base class header file operable to be included in an applications program, the base class header file containing a base class that declares a static member function for creating a utility object and at least one virtual member function for using the utility object; and
   at least one utility object library operable to be linked to the applications program, the at least one library associated with at least one of a plurality of operating systems, the at least one utility object library generated by compiling at least one of a plurality of derived classes with flags and settings for at least one of the operating systems, each derived class associated with one of the operating systems, the derived class defining the virtual member function, the derived class also defining the static member function such that the static member function creates the utility object as an instance of the derived class; and a processor operable to link the applications program to one of the at least one utility object library so that the applications program may use the utility in one of the operating systems.

15. A system for providing access to an operating system utility, comprising:

a memory operable to store:
   a base class header file operable to be included in an applications program, the base class header file containing a base class that declares a static member function for creating a utility object and at least one virtual member function for using the utility object; and
   at least one linkable object operable to be linked to the applications program, the at least one linkable object associated with at least one of a plurality of operating systems, the at least one linkable object created using at least one of a plurality of derived classes, each derived class associated with one of the operating systems, the derived class defining the virtual member function, the derived class also defining the static member function such that the static member function creates the utility object as an instance of the derived class, the at least one linkable object generated by compiling at least one of the derived classes with flags and settings for at least one of the operating systems; and a processor operable to link the applications program to one of the at least one linkable object so that the applications program may use the utility in one of the operating systems.

16. A system for providing access to an operating system utility, comprising:

a memory operable to store:
   a base class header file defining a base class associated with the utility, the base class declaring a static member function for creating a utility object and at least one virtual member function for using the utility object; and
   an applications program that includes the base class header file; and a processor operable to:
   link the applications program to one of a plurality of utility object libraries, each library associated with one of the operating systems, at least one utility object library generated by compiling at least one of a plurality of derived classes with flags and settings for at least one of the operating systems, each derived class associated with one of the operating systems, the derived class defining the virtual member function, the derived class also defining the static member function such that the static member function creates the utility object as an instance of the derived class; and
   invoke the static member function and the virtual member function.

17. A system for providing access to an operating system utility, comprising:

a memory operable to store:
   a base class header file defining a base class associated with the utility, the base class declaring a static member function for creating a utility object and at least one virtual member function for using the utility object; and
   an applications program that includes the base class header file; and a processor operable to:
   link the applications program to one of a plurality of linkable objects, each linkable object associated with one of a plurality of operating systems, each linkable object created using one of a plurality of derived classes, each derived class associated with one of the operating systems, the derived class defining the virtual member function, the derived class also defining the static member function such that the static member function creates the utility object as an instance of the derived class, at least one of the linkable objects generated by compiling at least one of the derived classes with flags and settings for at least one of the operating systems; and
   invoke the static member function and the virtual member function.

18. A system for providing access to an operating system utility, comprising:

means for declaring a static member function for creating a utility object and at least one virtual member function for using the utility object, the means for declaring operable to be included in an applications program;

at least one means for defining the virtual member function and the static member function such that the static member function creates the utility object as an instance, each means for defining associated with one of a plurality of operating systems;

means for compiling at least one of the means for defining with flags and settings for at least one of the operating systems to create at least one linkable object; and means for linking the applications program to one of the at least one linkable object so that the applications program may use the utility in one of the operating systems.

* * * * *